Patented Feb. 28, 1939

2,148,678

UNITED STATES PATENT OFFICE 2,148,678

APPARATUS FOR COMPARING A PLURALITY OF OSCILLATORY SYSTEMS

Ludwig W. Blau and Andrew B. Bryan, Houston, Tex., assignors to Standard Oil Development Company, a corporation of Delaware Application November 8, 1934, Serial No. 752,064

6 Claims. (Cl. 265—1.4)

This invention relates to improvements in apparatus for comparing a plurality of oscillatory systems.

It is an object of this invention to reduce the time of observation of gravity measurements when using pendulums or other oscillatory systems to a few seconds per station while retaining the required accuracy of one part in ten million. This object is accomplished by successively selecting and amplifying harmonics of the pendulum frequency up to a frequency of several million cycles per second. The two radio frequencies thus obtained from the two pendulums at two different locations are then combined to yield a beat frequency which is recorded by an oscillograph. If two identical pendulums are employed, they will have the same period if located at the same place. It is seen, then, that if one of these pendulums is moved to a point at which the value of gravity is greater by one part in one million parts, and if the one-millionth harmonic is being used in both cases, there will be a beat frequency of one-half cycle per second which is recorded by the oscillograph. It is thus necessary to observe and record for a few seconds only as compared with observation periods of several minutes to six hours customary by other methods previously known and employed.

The invention will be fully understood from the following description taken in connection with the accompanying drawings in which latter—

Fig. 1 shows schematically pendulums with circuit arrangements for each pendulum for selecting a high frequency for each circuit and comparing the frequencies, the pendulum circuits being disposed either at the same station or at stations sufficiently close to each other to permit of the pendulum circuits being connected by electrically conducting wires or the like.

Figure 1:
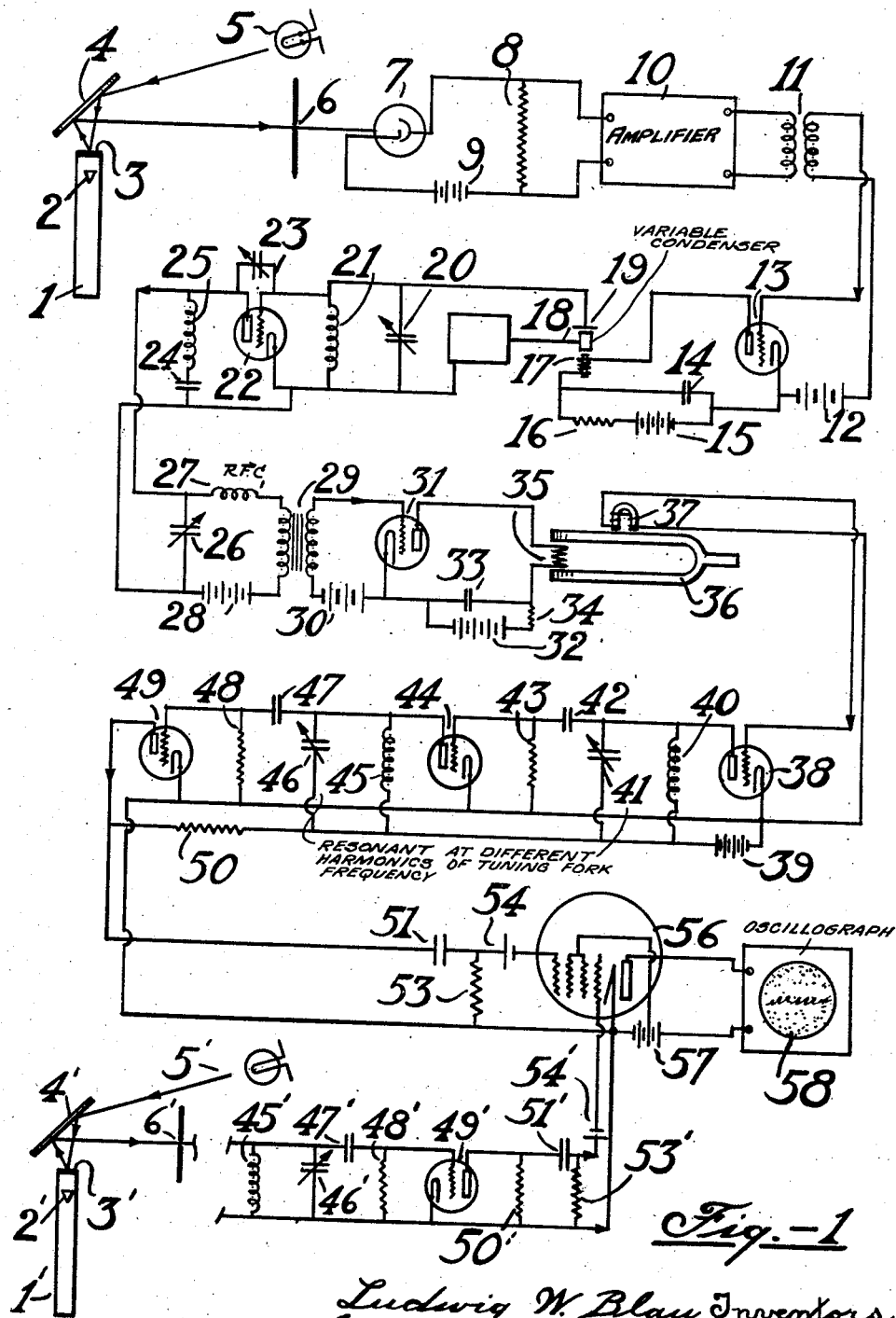

Referring particularly to Fig. 1 of the drawings, reference numeral 1 designates a pendulum which is mounted for oscillatory movement with respect to the knife edge 2; a mirror 3 is disposed upon the top of the pendulum 1 for oscillatory movement with the pendulum. A mirror 4 is disposed in fixed position above the pendulum to reflect light from a lamp 5 to the mirror 3, which in turn reflects the beam of light back to the mirror 4 whence it is thrown upon a screen having a slit 6. The beam of light passes through the slit 6 when the pendulum is passing through its equilibrium position and falls upon a photo- electric cell 7. The photo-electric cell 7 generates a pulsation of electric current each time the pendulum passes through equilibrium position.

It is to be noted here that while the oscillations of the pendulum will be sinusoidal, or nearly so, and, therefore, practically free of harmonics, the photo-electric cell distorts the oscillations markedly, thus introducing harmonics.

The wave representing the oscillations of the pendulum is substantially sinusoidal. Since, however, an impulse is imparted to the photoelectric cell only at the times when the pendulum passes its equilibrium position, the characteristics of the current set up by the photoelectric cell will be sharply peaked and will, therefore, contain a number of harmonics of the frequency of the oscillations of the pendulum but will have a fundamental frequency the same as the frequency of the pendulum.

The distorted pulsations of electric energy are amplified and are caused to actuate mechanical means for successively selecting a higher harmonic through the following arrangement of parts. Resistance 8 and a battery 9 are provided in the circuit of the photo-electric cell in the usual manner. The photo-electric current is amplified by the amplifier 10 and fed to the transformer 11, the secondary of which is connected in series with the battery 12 and across the grid of a vacuum tube 13. In the plate circuit of the vacuum tube 13, there is disposed a condenser 14 connected across the plate battery 15 and a resistance 16 in series; this combination of elements is connected in series with an iron core coil 17 which drives a reed 18. The natural frequency of the reed is chosen from five to ten times as high as the frequency of the pendulum 1. The reed vibrates with respect to its supporting base as shown. If the natural frequency of the reed is, for example, five times the frequency of the pendulum 1, it is seen that the reed will respond only to the fifth harmonic of the pendulum 1.

Electrical impulses transmitted from the reed 18 are caused to actuate further mechanical means for selecting a still higher harmonic for the system through the following arrangement of parts. A condenser is formed by means of a plate 19 and the flat top of the reed 18. A variable condenser 20 and a coil 21 are connected in parallel across the condenser 19 and across the grid of a tube 22. A variable feed back condenser 23 is connected from the grid to the plate of the tube 22. A condenser 24 and a coil 25 in series are connected across the plate and filament of the tube 22 as is also a variable condenser 26 and a radio frequency choke 27, B battery 28 and the primary of a transformer 29 in series. The secondary of the transformer 29 and a C battery 30 are connected across the grid and filament of a vacuum tube 31, in the plate circuit of which are connected a B battery 32, resistance 34, and a driving coil 35 in series. A condenser 33 is connected across the battery 32 and resistance 34. The coil 35 drives a tuning fork 36. The frequency of the tuning fork 36 is from five to ten times as high as the frequency of the reed 18. The tuning fork 36 will, therefore, respond to that harmonic lying between five and ten of the reed which has been selected. It is seen, then, that if the pendulum frequency is one cycle per second and the natural frequency of the reed 18 is five cycles per second and the tuning fork is tuned to the fifth harmonic of the reed 18, the tuning fork frequency will be 25. If, on the other hand, steps of ten have been selected, the tuning fork frequency will be one hundred cycles per second.

Electrical means having its input connected to the output of the tuning fork circuit is provided for further successively selecting a higher harmonic for each system. This electrical means comprises a magnetized iron cored coil 37 which cooperates with the tuning fork to pick up electrical impulses due to the vibrations of the tuning fork. These electric impulses are fed across the grid and filament of a vacuum tube 38. A choke 40 and variable condenser 41 are connected in parallel across the plate and filament of the vacuum tube 38. The inductance of the choke coil 40 and the capacity of the condenser 41 are selected to resonate at a frequency which is from five to ten times the frequency of the tuning fork 36. A condenser 42 connects this resonant system to a resistance 43 which is connected across the grid and filament of a vacuum tube 44. In the circuit connecting the vacuum tube 44 and the vacuum tube 49 are connected a coil 45, variable condenser 46, condenser 47, and resistance 48 in the same way as in the circuit between the vacuum tubes 38 and 44. The inductance of the coil 45 and the capacity of the variable condenser 46 are, however, so chosen that the resonant frequency of this system will be five to ten times the resonant frequency of the system composed of the coil 40 and the variable condenser 41. A B battery 39 provides the necessary voltage for the vacuum tubes 38, 44, and 49.

Any desired number of additional circuits such as those shown between the vacuum tubes 38 and 44 and between the vacuum tubes 44 and 49 are inserted following the tube 49, each circuit having a resonant system analogous to the resonant system composed of coil 40 and variable condenser 41 or the coil 45 and the variable condenser 46, the natural frequency of which system is so chosen as to resonate at a frequency from five to ten times the frequency of the preceding resonant system until the frequency has been increased to the desired frequency, which may be from one to several million cycles per second. A resistance 50 is connected in the plate circuit of the vacuum tube 49. A condenser 51 is connected in series with the resistance 50 across one of the grids of a multiple grid tube 56. A grid resistance 53 and a C-battery 54 are provided in the circuit. The system above described comprising elements 1 to 54 is duplicated by another system identical in all respects with the system above described and constituting elements 1' to 54'. The selected high harmonic of the system 1 to 54 is compared with the selected high harmonic of the system 1' to 54' through the following arrangement of parts. The system 1' to 54' is connected to another grid of the multiple grid tube 56. A battery 57 and an oscillograph 58 are connected in the plate circuit of the multiple grid tube 56.

The multiple grid tube 56 is fed by the two radio frequencies of one or several million cycles of the systems 1 to 54 and 1' to 54' so that the beat frequency is recorded by the oscillograph. Thus, if the frequency of the system 1 to 54 is one million cycles and the frequency of the system 1' to 54' is one million and one cycles, the oscillograph will record a frequency of one cycle per second.

The construction shown permits of increasing the amplitude of any harmonic desired, for example the millionth harmonic, of the pendulums 1 and 1' respectively and of recording on the oscillograph 58 the difference between these harmonics. The lower harmonics are amplified by mechanical means as by the reed 18 and the tuning fork 36, while the higher harmonics are selected and amplified by the electrical circuits shown between the vacuum tubes 38 and 44 and 44 and 49 respectively.

While the invention has been described in connection with the comparison of the beats of pendulums, it can be used in the comparison of the frequencies of vibrating systems, such as tuning forks, clocks, oscillators, or the like. If, for example, it is desired to adjust the frequency of a tuning fork so that it will be the same as the frequency of another tuning fork to one part in one million, it is only necessary to observe the beat frequency of the two systems for a few seconds after making each adjustment. If the millionth harmonic is employed, the tuning fork frequencies will agree to within one part in one million when the beat frequency is one cycle per second.

Figure 2:
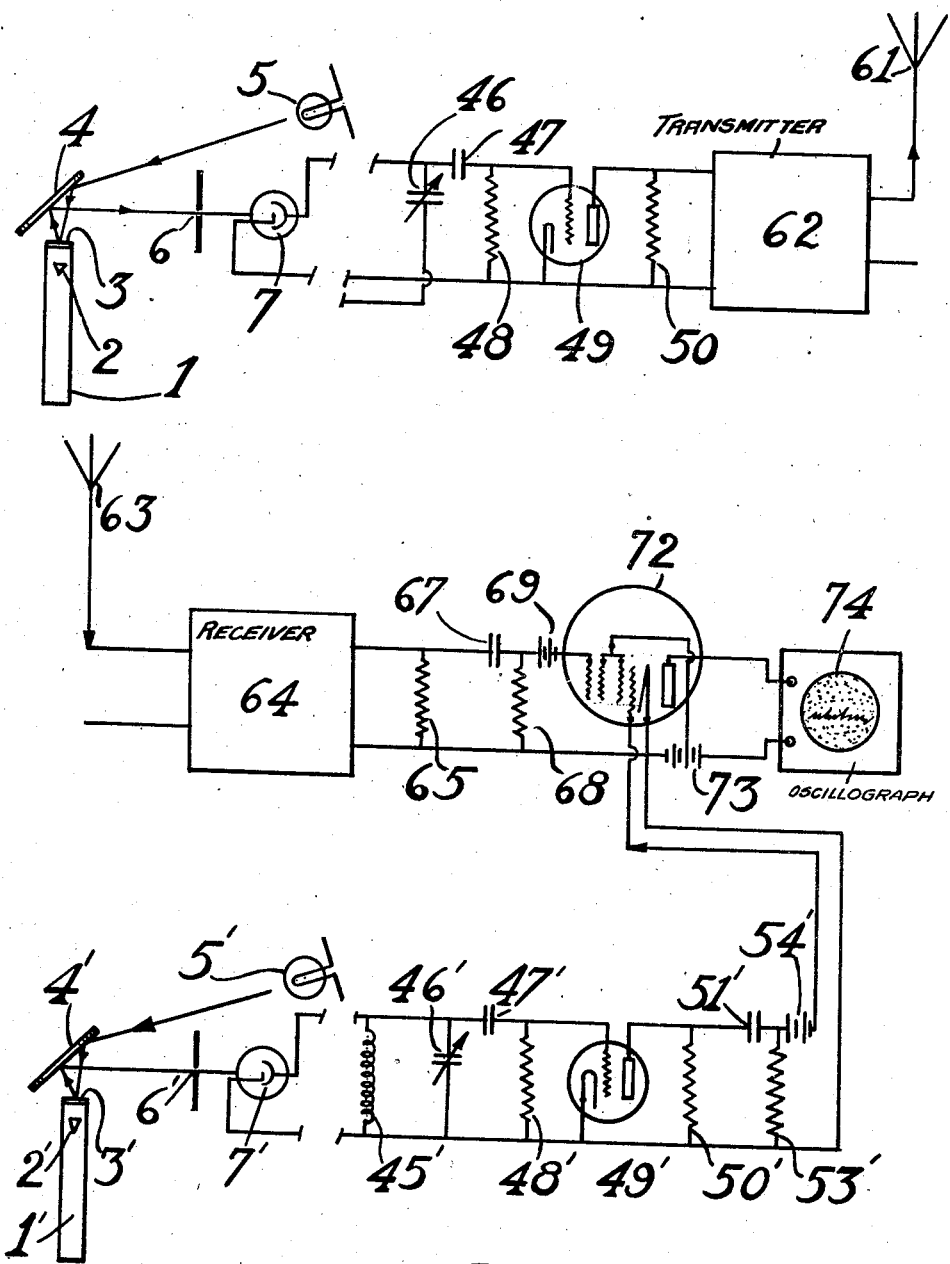
Fig. 2 shows schematically an arrangement in which radio communication is effected between the pendulum circuits.

In the use of the device in comparing accelerations due to gravity at spaced points on the crust of the earth, the pendulum 1 may be located at a base station while the pendulum 1' may occupy successively so-called field stations which may be at a distance of several hundred miles from the base station. In such a case, the condenser 51 is omitted from the system at the base station. The resistance 50 constitutes the output resistance of its system which leads into a radio transmitter 62 and an antenna 61 as shown in Fig. 2. The system at the field station is provided with a receiving antenna 63 which leads into a radio receiver 64. A resistance 65 is connected in the output from the radio receiver 64. A condenser 67 is connected in series with the resistance 65 across one of the grids of a multiple grid tube 72. A grid resistance 68 and a C-battery 69 are provided in the circuit. The system 1' to 54' is connected to another grid of the multiple grid tube 72. A battery 73 and an oscillograph 74 are connected in the plate circuit of the multiple grid tube 72. The resistance 65 is equal to the resistance 50'. The radio frequency of the system 1 to 50 is transmitted by means of the wireless transmitter 62 and antenna 61 to the field station, where the radio frequency is received by the antenna 63 and the wireless receiver 64 and combined with the locally produced radio frequency in the multiple grid tube 72. The beat frequency is recorded by the oscillograph 74. Conversely, the radio frequency of the system 1' to 54' may be transmitted by wireless to the base station and combined at the base station with the radio frequency of the system 1 to 50 in the multiple grid tube and the beat frequency recorded at the base station by the oscillograph.

By the construction described, the length of time necessary for observing differences in gravity by means of pendulums can be reduced to a few seconds.

Various changes may be made within the scope of the appended claims in which it is desired to claim all novelty inherent in the invention as broadly as the prior art permits.

We claim:

1. In a system for observing gravitational forces, an oscillating pendulum, means for setting up by the motion of said pendulum a corresponding train of electrical impulses, the fundamental frequency of which is the same as that of the pendulum, means for setting up mechanical vibrations by a harmonic of said train of electrical impulses, means for setting up by said mechanical vibrations a corresponding train of electrical impulses the fundamental frequency of which is the same as that of said mechanical vibrations, means for obtaining a harmonic of said second mentioned train of electric impulses and means for observing the frequency of the harmonics as the fundamental frequency changes.

2. A system for measuring changes in gravity along the earth's surface, comprising an instrumentality capable of indicating the force of gravity by oscillations, an electrical circuit, means for impressing thereon a current containing harmonics of said oscillations, a second oscillating means, the frequency of oscillation of which varies with the amplitude of its oscillations, associated with said current in a manner to be oscillated by one of said harmonics, a second electrical circuit, means for impressing thereon a current of the oscillations of said second oscillating means and means for multiplying the frequency of one of said harmonics to a predetermined value.

3. A system for measuring changes in gravity along the earth's surface, comprising an instrumentality capable of indicating the force of gravity by oscillations, an electrical circuit, means mechanically independent of said instrumentality for impressing on said circuit a current containing harmonics of said oscillations, a second oscillating means, the frequency of oscillation of which varies with the amplitude of its oscillations, associated with said circuit in a manner to be oscillated by one of said harmonics, a second electrical circuit, means for impressing thereon a current containing harmonics of the oscillations of said second oscillating means and means for multiplying the frequency of said current to a predetermined value.

4. A system for measuring changes of gravity along the earth's surface, comprising an instrumentality capable of indicating the force of gravity by oscillations and having a given natural frequency, an electrical circuit, means for impressing thereon a current containing harmonics of said oscillations, a second oscillating means, the frequency of oscillation of which varies with the amplitude of its oscillations, having a natural frequency which is a multiple of the natural frequency of said instrumentality associated with such circuit in a manner to be oscillated by one of said harmonics, a second electrical circuit, means for impressing thereon a current containing harmonics of the oscillations of said second oscillating means and means for multiplying the frequency of said current to a predetermined value.

5. A system, according to claim 2, in which the second oscillating means is a tuning fork.

6. In a system for observing gravitational forces, an oscillating pendulum, means for converting the motion of the pendulum into electrical impulses, means for converting a selected frequency of said impulses into mechanical vibrations, means for converting said vibrations into electrical impulses, means of obtaining a predetermined high-frequency current from said last mentioned impulses, and means for comparing the obtained frequency with a known frequency.

LUDWIG W. BLAU.
ANDREW B. BRYAN.